(12) United States Patent
Whiteley et al.

(10) Patent No.: US 11,078,789 B2
(45) Date of Patent: Aug. 3, 2021

(54) POLYMER SHEET, METHOD OF INSTALLING AND PRODUCING SAME

(71) Applicant: COREX PLASTICS (AUSTRALIA) PTY LTD, Victoria (AU)

(72) Inventors: Simon Douglas Whiteley, Victoria (AU); Edward Philip Bacon, Victoria (AU)

(73) Assignee: COREX PLASTICS (AUSTRALIA) PTY LTD, Victoria (AU)

( * ) Notice: Subject to any disclaimer, the term of this patent is extended or adjusted under 35 U.S.C. 154(b) by 156 days.

(21) Appl. No.: 16/322,577

(22) PCT Filed: Aug. 2, 2017

(86) PCT No.: PCT/AU2017/050811
§ 371 (c)(1),
(2) Date: Feb. 1, 2019

(87) PCT Pub. No.: WO2018/023161
PCT Pub. Date: Feb. 8, 2018

(65) Prior Publication Data
US 2019/0203598 A1 Jul. 4, 2019

(30) Foreign Application Priority Data
Aug. 2, 2016 (AU) ............................... 2016903033

(51) Int. Cl.
*E21D 11/00* (2006.01)
*E21D 19/00* (2006.01)
(Continued)

(52) U.S. Cl.
CPC .......... *E21D 19/00* (2013.01); *B29C 48/0022* (2019.02); *B29C 48/08* (2019.02);
(Continued)

(58) Field of Classification Search
CPC ..... E21D 11/152; E21D 11/006; E21D 19/00; B29C 48/92; B29C 48/08; B29C 48/0022
(Continued)

(56) References Cited

U.S. PATENT DOCUMENTS 5,849,645 A * 12/1998 Lancaster ............... E02B 3/125
442/5
7,001,112 B2 2/2006 Walsh
(Continued)

FOREIGN PATENT DOCUMENTS

DE 4104298 A1 * 8/1992
WO 2013181706 A1 12/2013

OTHER PUBLICATIONS

International Application No. PCT/AU2017/050811, "International Search Report and Written Opinion" dated Oct. 17, 2017.
(Continued)

*Primary Examiner* — Sunil Singh
(74) *Attorney, Agent, or Firm* — Kilpatrick Townsend & Stockton LLP (57) ABSTRACT

A polymer sheet adapted to attach to a material body such as a ceiling of a geological cavity and provide protective cover. The sheet comprises: a webbing portion defining a plurality of primary openings; and two margin portions extending along opposite edges of the sheet on either side of the webbing portion along a length of the sheet, each margin portion defining a plurality of secondary openings, wherein the margin portions are angled relative to the webbing portion.

20 Claims, 8 Drawing Sheets (51) Int. Cl.
  *B29C 48/08* (2019.01)
  *B29C 48/00* (2019.01)
  *B29C 48/92* (2019.01)
  *E21D 11/15* (2006.01)
  *B29L 31/00* (2006.01)

(52) U.S. Cl.
  CPC ............ *B29C 48/92* (2019.02); *E21D 11/006* (2013.01); *E21D 11/152* (2013.01); *B29L 2031/768* (2013.01)

(58) Field of Classification Search
  USPC .......................................... 405/302.3, 302.7
  See application file for complete search history.

(56) References Cited

U.S. PATENT DOCUMENTS

| | | | |
|---|---|---|---|
| 8,596,930 B2 * | 12/2013 | Woudenberg | E02D 17/202 |
| | | | 405/302.6 |
| 2008/0237963 A1 | 11/2008 | Woudenbert et al. | |
| 2008/0279639 A1 | 11/2008 | Woudenbert et al. | |
| 2011/0176876 A1 | 7/2011 | Scuero | |
| 2012/0243949 A1 | 9/2012 | Schneider et al. | |

OTHER PUBLICATIONS

"Rib Support Mesh, Corrugated Plastic Mesh Sheets", Applied Research of Australia Ltd, 2014, 2 pages.
"Tensar® Uniaxial (UX) 3326 Roof Mats for Mines and Tunnels", Underground Heavy-Duty Roof and Rib Control Offers Safety and Security, Mining Underground and Surface Systems, Tensar International Corporation, 2008, 2 pages.

\* cited by examiner

```
Positioning a first polymer sheet adjacent to a mining
cavity ceiling
610
                          ↓
Attaching a first portion of the
first polymer sheet to the ceiling
620
                          ↓
Attaching a second portion of the first
polymer sheet to the ceiling
622
                          ↓
Positioning a second polymer sheet such that the second polymer sheet and first
polymer sheet are partially overlapping
630
                          ↓
Attaching at least one portion of the second polymer
sheet to the ceiling
632
```

Figure 8

POLYMER SHEET, METHOD OF INSTALLING AND PRODUCING SAME

TECHNICAL FIELD

The present disclosure generally relates to sheet products suitable for attachment to a material body. More specifically, the present disclosure relates to polymer sheet products for providing protection from loose material falling from a material body and methods for producing and installing these products.

BACKGROUND

Underground mining operations involve the excavation of cavities such as tunnels. When a mine cavity is dug out, the material ahead of the mining excavator is removed and, while supporting the roof with another machine, 1.2-1.5 m deep holes may be drilled into the ceiling about 1 m apart. A long rock bolt packed with an expanding glue resin can be inserted into these holes. Once the long bolt is anchored in position, a plate and nut may be attached to the end of the long bolt to tension the long bolt. This creates a compression load on the surrounding rock to reduce the risk of the ceiling or walls of the mine cavity collapsing.

Despite advances in automating mining technology, mining operators may still need to work in such tunnels. One of the dangers faced by mining operators or mine workers in an underground tunnel is from rocks or other debris that may fall from the ceiling of the mine cavity. It is a requirement in underground mining to mitigate or limit the falling of debris such as loose rock from the ceiling or wall. In particular, there is a need to reduce the risk of injury from large rocks falling onto mining operators.

To reduce this risk, a metal mesh product comprising metal rods may be secured in place on a ceiling while the long rock bolts are installed. A plate and nut attached to the long bolts may be used to secure the metal rod mesh in place on the ceiling of the mine cavity. Rocks that are larger than the gaps in the metal mesh or rocks that are directly contacting the metal rods of the metal mesh may be thereby restricted from falling from the ceiling.

However, the mesh may have exposed ends of metal rods which can cause injury to operators installing the mesh. The metal mesh may be undesirably heavy which makes it difficult to transport deep into the mine and difficult for workers to install without the use of specialised equipment or machinery. The metal mesh also has relatively large gaps between the metal rods compared to the width of the metal rods. Additionally, the conductive nature of metal and alkalinity of ground water leads to corrosion which reduces the expected service life of the metal mesh product.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a polymer sheet adapted to attach to a material body and limit loose material passing the polymer sheet, the sheet comprising:

a webbing portion defining a plurality of primary openings; and two margin portions extending along opposite edges of the sheet on either side of the webbing portion along a length of the sheet, each margin portion defining a plurality of secondary openings, wherein the margin portions are angled relative to the webbing portion.

Some embodiments relate to a polymer sheet adapted to attach to a ceiling of a geological cavity and provide protective cover, the sheet comprising:

a webbing portion defining a plurality of primary openings; and two margin portions extending along opposite edges of the sheet on either side of the webbing portion along a length of the sheet, each margin portion defining a plurality of secondary openings, wherein the margin portions are angled relative to the webbing portion.

In some embodiments, the sheet is shaped such that the margin portions are angled out of a webbing plane defined by the webbing portion and the sheet defines elongate creases between the webbing portion and each margin portion. In some embodiments, the margin portions are angled out of the webbing plane in opposite directions on either side of the webbing plane. In some embodiments, the elongate creases form an obtuse angle between the webbing portion and either of the margin portions in the range of 140é to 160é.

In some embodiments, the plurality of primary openings are arranged in a regular array. In some embodiments, the secondary openings defined by the two margin portions are arranged in a regular array. In some embodiments, the regular array of secondary openings in each margin portion is the same so that, when either one of the margin portions and a margin portion on an identical but separate sheet are overlapping, at least two of the secondary openings are aligned.

In some embodiments, the separation between the secondary openings is greater than the separation between primary openings.

In some embodiments, the sheet comprises a plurality of webbing portions and adjacent webbing portions are separated by a wider web portion extending between the margin portions. In some embodiments, the dimension of the wide web portion is greater than the largest dimension of the openings.

In some embodiments, the sheet is a self-supporting structure and is flexible.

In some embodiments, the polymer sheet comprises any one of polypropylene, polyethylene, low-density polyethylene, medium-density polyethylene, high-density polyethylene, polymers of olefins, Acrylonitrile butadiene styrene (ABS), polycarbonate and amorphous polymers.

In some embodiments, the sheet has a thickness in the range of about 1 mm to about 12 mm.

Some embodiments relate to a method of installing protective covering on a ceiling of a geological cavity comprising:

positioning a first polymer sheet according to any one of the preceding claims near or on the ceiling;

attaching a first portion of the first polymer sheet to the ceiling, wherein the attaching comprises using fasteners to attach the first portion to the ceiling, and a first section of each fastener is attached to the ceiling while a second section of each fastener passes through either a primary or secondary opening defined by the first polymer sheet.

In some embodiments, the method further comprises attaching a second portion of the first polymer sheet to the ceiling, the first portion is near a first end of the first polymer sheet and the second portion is near a second end opposite the first end along the length of the first polymer sheet.

In some embodiments, the method further comprises:
positioning a second polymer sheet according to any one of the disclosed embodiments such that: the second polymer sheet partially overlaps the first polymer sheet, and at least one of the primary or secondary openings in the second polymer sheet is aligned with a primary or secondary opening in the first polymer sheet and
attaching at least one portion of the second polymer sheet to the ceiling.

In some embodiments, attaching the at least one portion of the second polymer sheet comprises using the same fasteners used to attach the first or second portion of the first polymer sheet to the ceiling, and the second section of the fasteners pass through aligned openings in the first and second polymer sheet.

In some embodiments, the positioning comprises overlapping a first margin portion of the first polymer sheet and a second margin portion of the second polymer sheet.

In some embodiments, at least two portions of the second polymer sheet are attached to the ceiling and at least one portion is near a first end of the second polymer sheet and at least one portion is near a second end opposite the first end along the length of the second polymer sheet.

Some embodiments relate to a method of producing a polymer sheet adapted to attach to a ceiling of a geological cavity and provide protective cover, the method comprising:
extruding a polymer material into a sheet with a length and a width;
forming a plurality of primary openings in a webbing portion and a plurality of secondary openings in each of a first and second margin portion, wherein the first and second margin portion extend along opposite edges of the sheet on either side of the webbing portion along the length of the sheet;
shaping the sheet such that the first and second margin portion are angled relative to the webbing portion.

In some embodiments, forming the plurality of openings comprises stamping the openings through the sheet. In some embodiments, the plurality of primary openings are formed in a regular array. In some embodiments, the one or more secondary openings are formed in a regular array. In some embodiments, the regular array of secondary openings in the first margin portion is produced to be the same as the regular array of secondary openings in the second margin portion so that, when either of the first or second margin portion and a margin portion on an identical but separate sheet are overlapping, at least two of the secondary openings are aligned.

In some embodiments, shaping the sheet comprises heating the sheet to soften the sheet. In some embodiments, the sheet is shaped such that the margin portions are angled out of a webbing plane defined by the webbing portion and the sheet defines elongate creases between the webbing portion and each of the first and second margin portions. In some embodiments, the sheet is shaped such that the first margin portions is angled out of the webbing plane in a first direction and the second margin portion is angled out of the webbing plane in a second direction on the other side of the webbing plane.

In some embodiments, the separation between the secondary openings is greater than the separation between primary openings.

In some embodiments, forming the plurality of primary openings results in a plurality of webbing portions, and adjacent webbing portions are separated by a wider web portion extending between the margin portions.

In some embodiments, the polymer comprises any one of polypropylene, polyethylene, low-density polyethylene, medium-density polyethylene, high-density polyethylene, polymers of olefins, Acrylonitrile butadiene styrene (ABS), polycarbonate and amorphous polymers.

In some embodiments, the method of producing the polymer sheet further comprises cutting the sheet along the width to form a separate sheet and the length of the sheet.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments are described in further detail below, by way of example, with reference to the accompanying drawings briefly described below.

DETAILED DESCRIPTION

The present disclosure generally relates to sheet products suitable for attachment to a material body. More specifically, the present disclosure relates to a polymer sheet product for providing protection from loose material falling from a material body and methods for producing and installing these products. For example, the material body may be a geological cavity or an embankment. The loose material may include rocks or other debris from the material body.

Figure 1A:
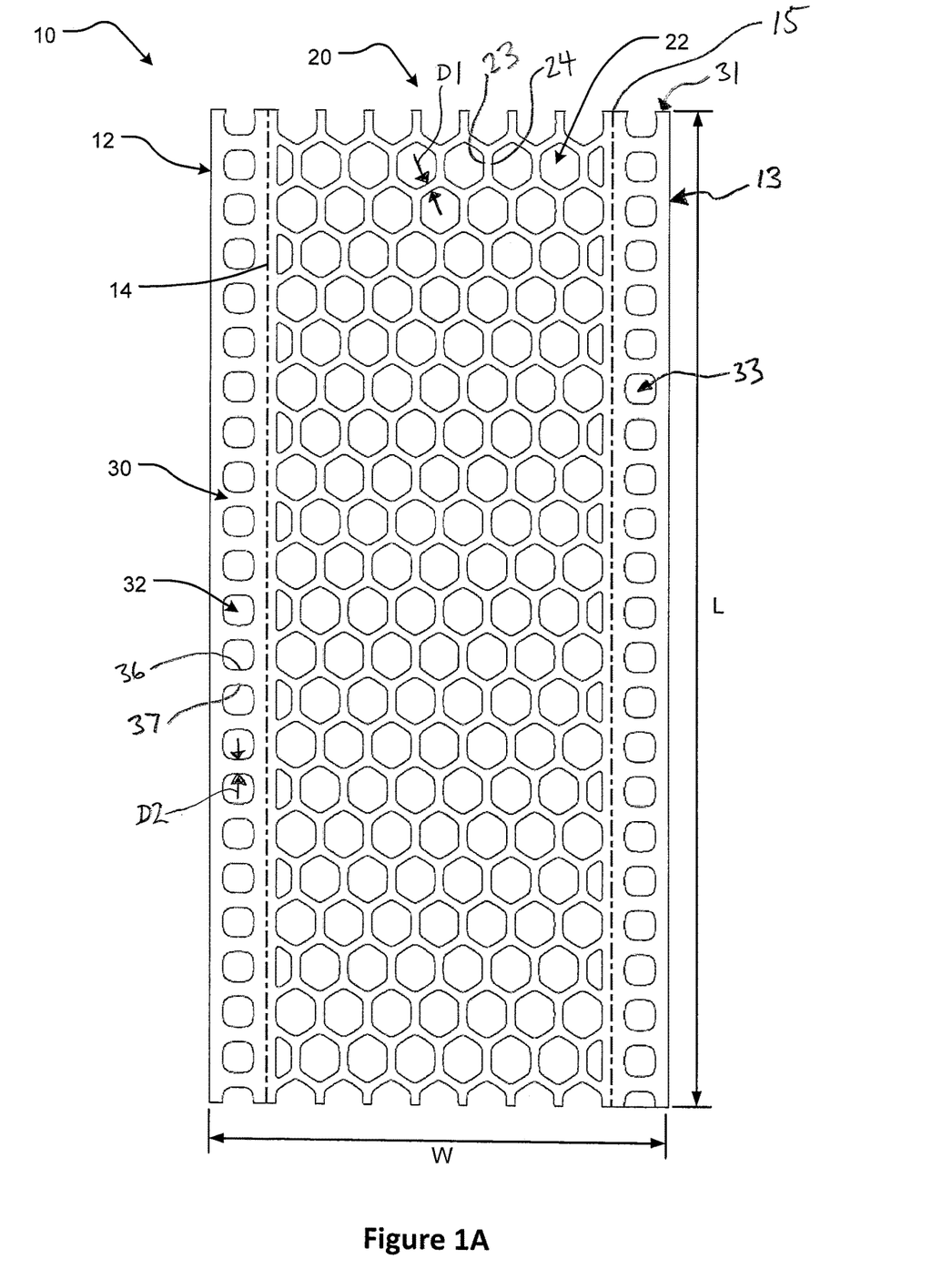
FIG. 1A is a top view of a polymer sheet according to an embodiment.
Figure 1B:
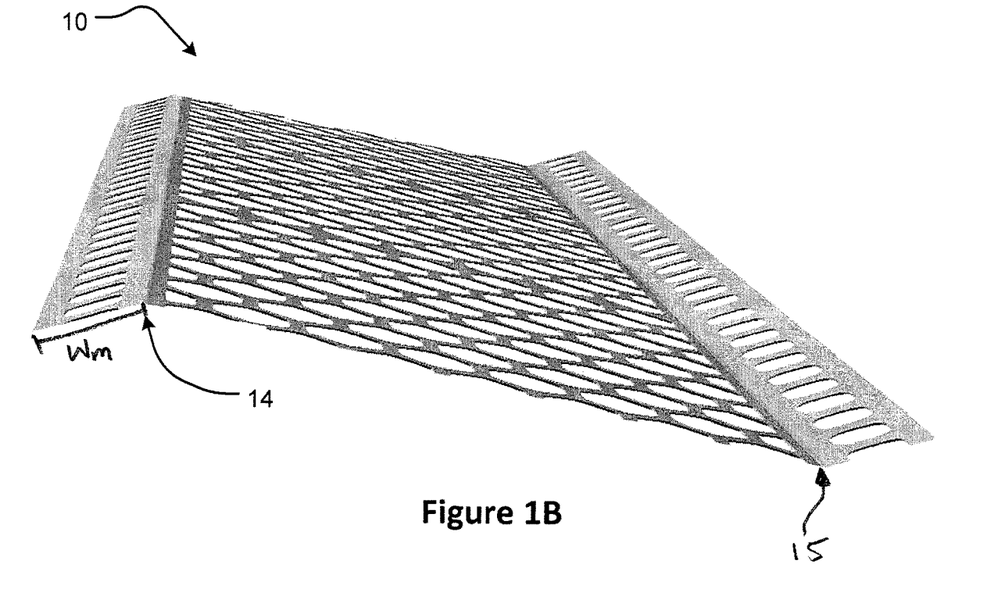
FIG. 1B is an isometric view of the polymer sheet shown in FIG. 1A.
Figure 1C:
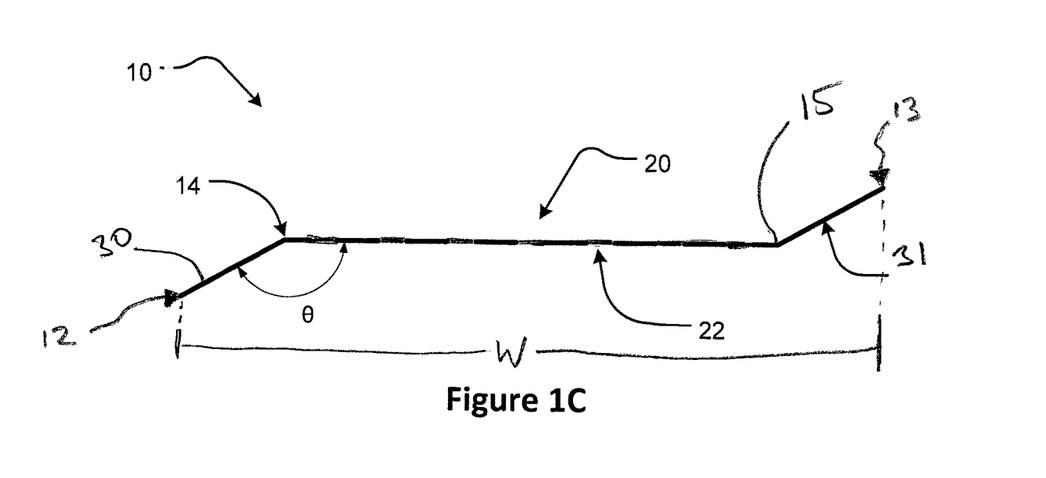
FIG. 1C is an end on view of the polymer sheet shown in FIGS. 1A and 1B.

Referring to FIGS. 1A, 1B and 1C, a sheet 10 is illustrated according to an exemplary embodiment which is adapted to attach to a ceiling of a geological cavity or a surface of a material body and provide protective cover. The geological cavity may be a mine cavity that is subterranean and underground. This is intended to also include, for example, a cavity or a tunnel within a mountain.

The sheet 10 is formed from a polymer material and comprises a webbing portion 20 defining a plurality of primary openings 22 extending through the webbing portion 20. The sheet 10 also comprises two margin portions 30, 31 extending along opposite edges 12, 13 of the sheet 10 on either side of the webbing portion 20 along a length L of the sheet 10. The two margin portions 30, 31 each define a plurality of secondary openings 32, 33 extending through the margin portions 30, 31.

The sheet 10 is shaped such that the margin portions 30, 31 are angled relative to the webbing portion 20. In some embodiments, the sheet 10 is shaped such that the margin portions 30, 31 are angled out of a webbing plane defined by the flat plane that the webbing portion 20 lies in. The sheet 10 may therefore define elongate corners or creases 14, 15. In some embodiments, the margin portions 30, 31 may be angled out of the webbing plane in opposite directions on either side of the webbing plane.

An obtuse angle: (FIG. 1C) may be defined between the webbing portion 20 and each of the margin portions 30, 31. In some embodiments, the obtuse angle: is in the range of 140é to 160é. In some embodiments, the obtuse angle: is in the range of 145é to 155é. In some embodiments, the obtuse angle: is about 150é.

Alternatively, the angle of the margin portions 30, 31 can be described by an acute angle between the margin portion 30, 31 and the webbing plane, the acute angle being equal to the obtuse angle: subtracted from 180é.

Advantageously, the angled margin portions 30, 31 of the sheet 10 may also assist in increasing the rigidity of the sheet 10 such that the sheet 10 is less flexible in the direction along the length L of the sheet 10. This may assist in the attachment of the sheet 10 onto a ceiling of a mining cavity as the entire sheet 10 can be supported and pressed up against the ceiling by supporting the sheet 10 at only one or two portions of the sheet 10. This may also assist in the maneuvering and transportation of the sheet 10 prior to installation.

Figure 2:
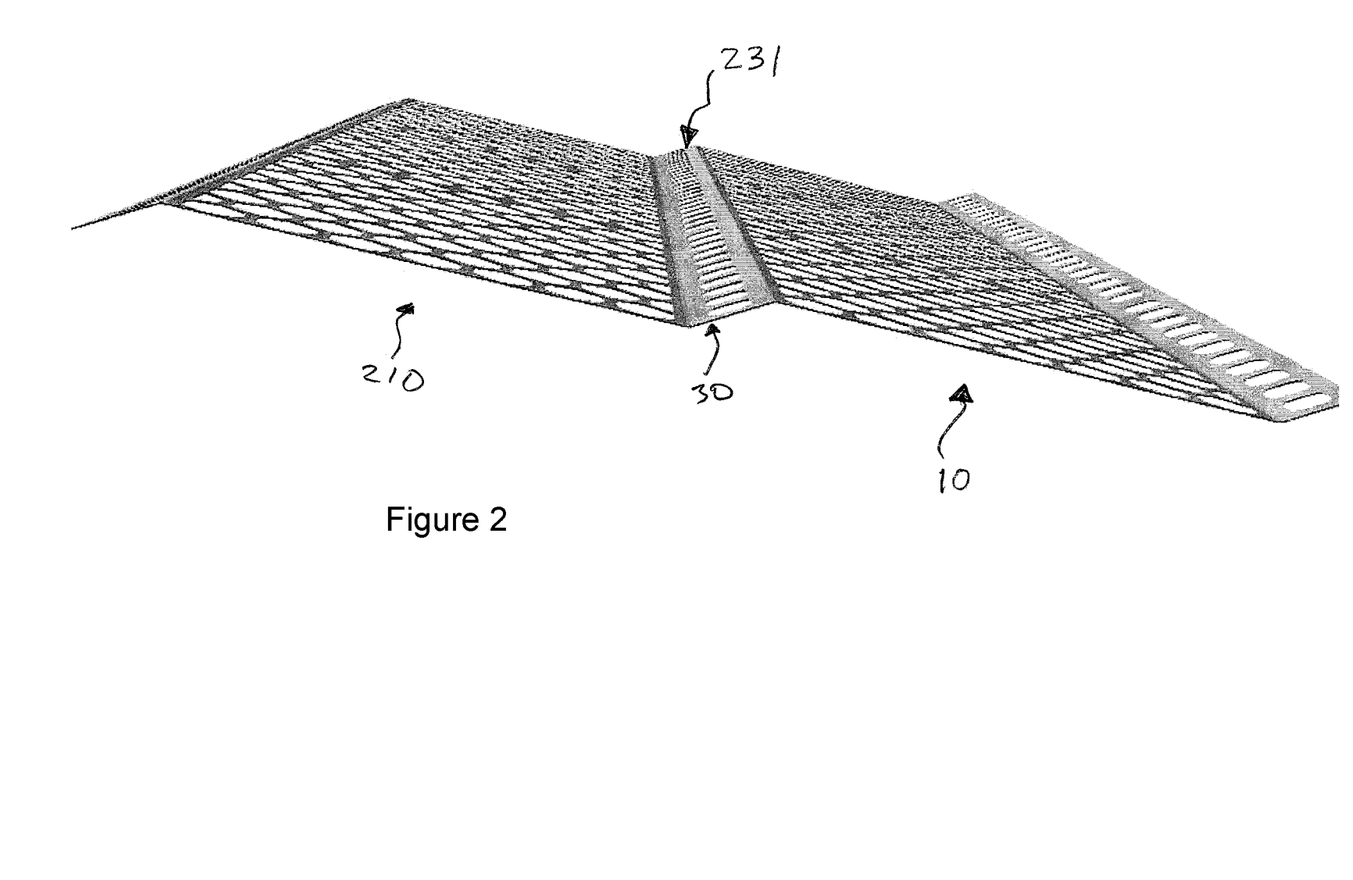
FIG. 2 is a perspective view of two adjacent and partially overlapping polymer sheets according to an embodiment.

Referring to FIG. 2, the sheet 10 and an identical but separate sheet 210 are positioned such that they are aligned along their lengths L and partially overlapping. The angled margin portion 30 and a margin portion 231 on the identical but separate sheet 210 may be overlapping. This configuration of sheets 10, 210 may advantageously slightly restrict relative movement of the sheets 10, 210 in a direction along the widths W of the sheets 10, 210. This configuration may also advantageously assist in keeping sheets 10, 210 in position while they are being attached to a ceiling. and assist installation of adjoining sheets 10, 210 in an array along the ceiling of a geological cavity. The first margin portion 30 may be positioned on top of the second margin portion 231 and closer to the ceiling in an interlocking configuration. This may advantageously slightly restrict the sheets 10, 210 from moving apart from each other. Alternatively, the second margin portion 231 may be on top of the first margin portion 30 in an abutting configuration. This may advantageously slightly restrict the sheets 10, 210 from moving closer together and further overlapping each other. This may assist in aligning the sheets 10, 210 in the direction along the widths W during: installation, and storage of sheets 10, 210 if they are stacked on top of each other.

The at least one secondary opening 32 defined by margin portion 30 on sheet 10 is positioned such that, when the margin portion 30 and the margin portion 231 on the identical separate sheet 210 are overlapping, two or more secondary openings 33 on the separate sheet 210 are aligned with at least two of the plurality of secondary openings 32 defined by the margin portion 30 on sheet 10 when the sheets 10, 210 are aligned. The first margin portion 30 may be on top of the second margin portion 231 and closer to the ceiling in an interlocking configuration. Alternatively, the second margin portion 231 may be on top of the first margin portion 30 in an abutting configuration. These configurations advantageously enable a fastener such as a rock bolt to be passed through one of the secondary openings 32 in sheet 10 and one of the secondary openings 233 in sheet 210 to attach at least a portion of the sheets 10, 210 to the ceiling.

Advantageously, this enables the sheets 10, 210 to be simultaneously attached to the ceiling and to each other. This advantageously provides a secure attachment of sheets 10, 210 to the ceiling to assist in retaining loose rocks that may be dislodged from and otherwise fall from the ceiling. In an exemplary embodiment, the fastener may be attached to the ceiling of a mining cavity along with an associated plate.

The length L may be considered the distance along the longest edge of the sheet 10. In some embodiments, the sheet 10 has a length L in the range of 2 to 8 m or a length L in the range of 3 to 5 m. In an exemplary embodiment, the sheet has a longest length of about 4 m.

The width W of the sheet 10 may be measured as a top down projection of the 3-dimensional structure (see FIG. 2). In some embodiments, the width is in the range of 1 to 2 m. In an exemplary embodiment, the width W is about 1.5 m.

The sheet may have a thickness defined as the dimension orthogonal to both the length L and the width W. In some embodiments, the sheet has a thickness in the range of 1 to 12 mm. In some embodiments, the sheet has a thickness in the range of 4 to 8 mm. In an exemplary embodiment, the sheet has a thickness of about 6 mm. Advantageously, the thickness of the sheet 10 may be optimised to reduce the overall weight of the sheet 10 while maintaining: rigidity in the sheet 10 to enable the sheet 10 to be positioned on the ceiling while only being supported at one or two portions; and/or strength to assist in capturing and/or retaining loose material that may be dislodged from the ceiling.

The margin portions 30, 31 may have a margin width $W_m$ measured along the margin portion between the edges 12, 13 and the elongate creases 14, 15. In some embodiments, the margin width $W_m$ is in the range of 100 to 200 mm.

In the exemplary embodiment shown in the drawings, the primary openings 22 have a hexagonal shape. In other embodiments, the primary openings 22 may have a circular shape, an elliptical shape or any other shape such as a square, a rectangle or an octagon.

In the exemplary embodiment shown in the drawings, the secondary openings 32, 33 have a generally square shape with rounded corners. In some embodiments, the secondary openings 32, 33 may have a circular shape, an elliptical shape or any other shape such as a square, a rectangle or an octagon.

In some embodiments, the primary openings 22 are all the same shape and size and/or the secondary openings 32, 33 in the margin portions 30, 31 are all the same shape and size. In other embodiments, the primary openings 22 and secondary openings 32, 33 may be of different shapes and sizes.

In some embodiments, the primary openings 22 have a largest dimension in the range of 50 to 110 mm. In some embodiments, the primary openings 22 have a largest dimension in the range of 75 to 110 mm. In some embodiments, the primary openings 22 have a largest dimension of about 100 mm. Advantageously, the primary openings 22 are dimensioned to reduce the overall weight of the sheet 10 while not being so large as to allow loose rocks that are large enough to pose an unacceptable danger to mining operators to fall through the sheet 10.

In some embodiments, the primary openings 22 are arranged in a regularly spaced array. In the exemplary embodiment illustrated, the array is a regular triangular array where the centres of each primary opening 22 lies on the vertices of a triangular lattice which may give the appearance of a hexagonal array. In some embodiments, the webbing portion 20 is arranged to define each primary opening 22 at an equal distance from each of its nearest primary openings 22. In some embodiments, the separation D1 between the edges 23 of each primary opening 22 from the edge 24 of an adjacent primary opening 22 is in the range of 10 to 50 mm. In some embodiments, the separation D1 between the edges of the primary openings 22 is less than the largest dimension of the primary openings 22, optionally less than 50% or less than 30% of the largest dimension. The array may advantageously provide the webbing portion 20 with improved stress relief to distribute stresses within the webbing portion and mitigate tearing or damage to the webbing portion 20.

In some embodiments, the plurality of primary openings 22 are arranged in a square array where the centres of the primary openings 22 lie on the vertices of a square lattice. In these embodiments, the webbing portion 20 is arranged to define each primary opening 22 at an equal distance from each of its four nearest primary openings 22.

In some embodiments, a plurality of secondary openings 32, 33 are defined by the margin portions 30, 31 and the secondary openings 32, 33 are arranged in an array. In the exemplary embodiment illustrated in FIGS. 1A, 1B and 1C, the array is a linear array. The secondary openings 32 may be equally spaced from each other along the margin portion 30 and the secondary openings 33 may be equally spaced from each other along the margin portion 31.

In some embodiments, the edges 36 of the secondary openings 32, 33 are separated from the nearest edge 37 of an adjacent secondary opening 32, 33 by a separation D2 in the range of 20 mm to 60 mm (FIG. 1A). In some embodiments, the separation D2 between the secondary openings 32, 33 is greater than the separation D1 between primary openings 22. For example, the separation D2 between the edges 36, 37 of the secondary openings 32, 33 may be greater than the separation D1 between the edges 23, 24 of the primary openings 22, optionally more than 50% or more than 30% of the separation D1. Advantageously, the larger separation D2 between the edges 36, 37 of the secondary openings 32, 33 provides additional material to the margin portion 30, 31 of sheet 10 to assist a fastener to attach the sheet 10 to the ceiling of a geological cavity and to attach the sheet 10 to an adjacent and partially overlapping sheet 10, 210. The additional material provided may also increase the strength of the margin portions 30, 31.

Figure 3:
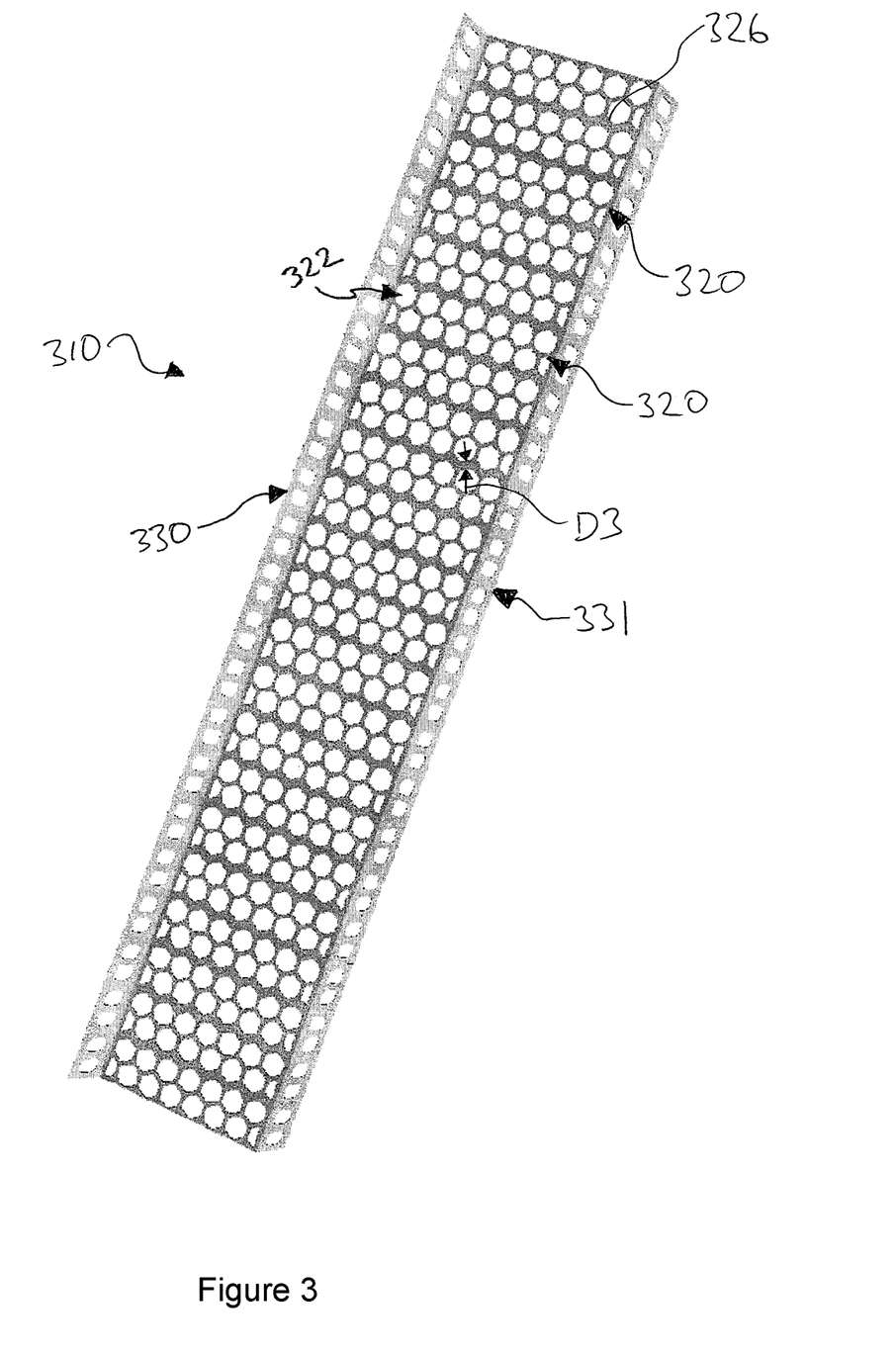
FIG. 3 is a perspective view of a polymer sheet according to an embodiment.
Figure 4:
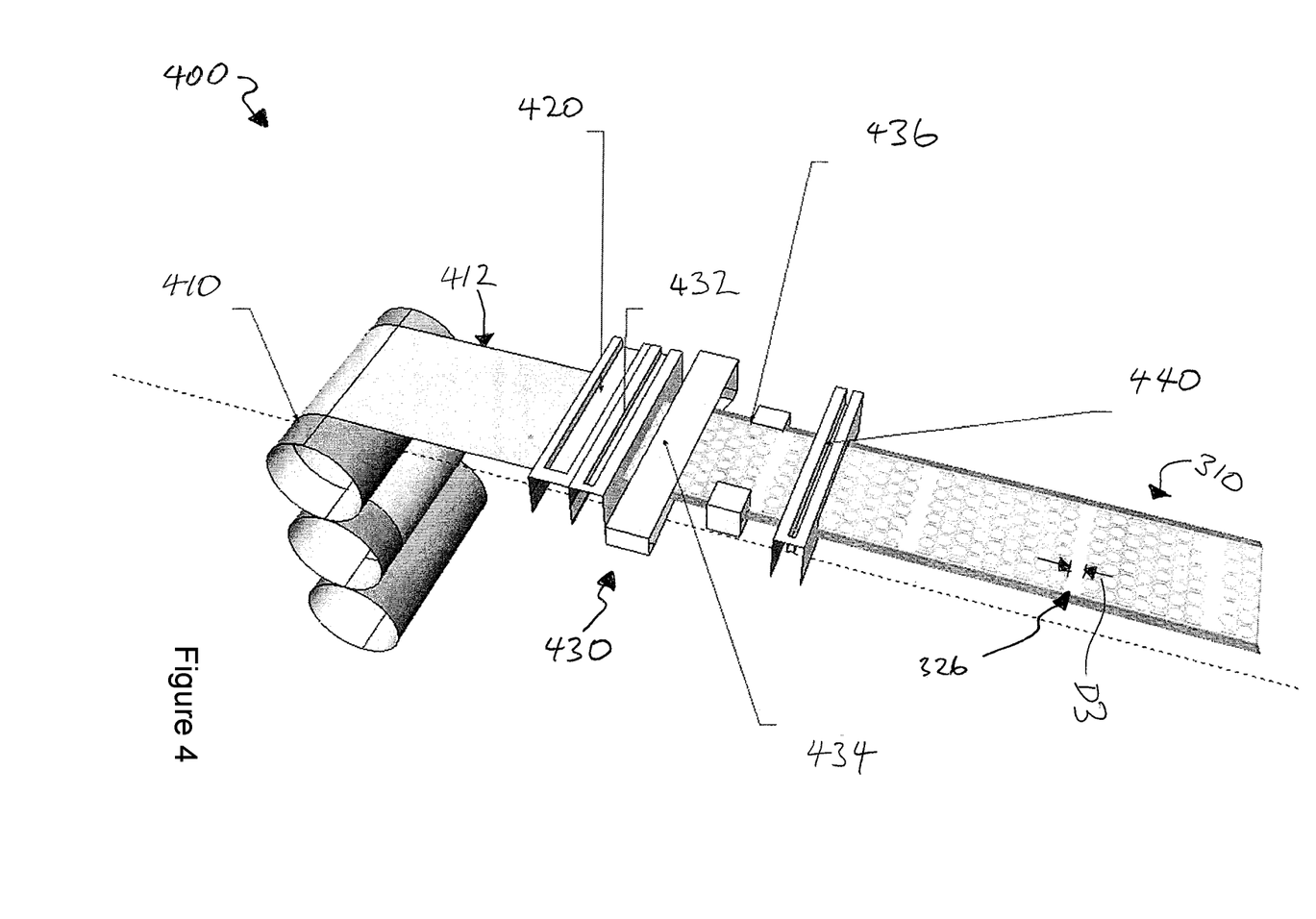
FIG. 4 is a perspective view of an apparatus for producing a polymer sheet according to some embodiments.

Referring to FIGS. 3 and 4, in some embodiments the sheet 10, 310 comprises a plurality of webbing portions 20, 320 where adjacent webbing portions 20, 320 are separated by an optional wider web portion 326 extending between two margin portions 30, 31, 330, 331. In some embodiments, the width D3 of the wider web portion 326 is the shortest distance between the primary openings 22, 322 from adjacent webbing portions 20, 320. The width D3 is greater than the separation D1 between primary openings 22, 322 in the same webbing portion 20, 320. In some embodiments, the width D3 is in the range of 20 to 150 mm. Advantageously, the wider web portion 326 may increase the rigidity of the sheet 10, 310 in the direction along the width W of the sheet 10, 310. This may assist mining operators when the sheet 10, 310 is being attached to the ceiling of a mining cavity as the sheet 10, 310 may be pressed up against the ceiling by only supporting the sheet 10, 310 at one or two parts. The wider web portion 326 may also advantageously provide additional support to retain loose rocks from the ceiling because they cover a larger area of the ceiling.

In preferred embodiments, the sheet 10 is formed from a polymer material. In some embodiments, the polymer material is selected from the group of: polypropylene, polyethylene, low-density polyethylene, medium-density polyethylene, high-density polyethylene, polymers of olefins, Acrylonitrile butadiene styrene (ABS), polycarbonate and amorphous polymers. As polymer materials have a lower density than steel, the sheet 10 may be advantageously lighter than a similarly sized steel mesh used to restrict loose material (such as rocks) from falling from ceilings in mine cavities. Lighter weight sheets 10 are advantageously easier to attach to a ceiling by mining operators as less effort is required to raise and support them against the ceiling. Furthermore, polymer materials are more resistant to damage from corrosion due to exposure to corrosive conditions such as exposure to acidic or alkaline substances.

In some embodiments, the sheet 10 may be formed from polymers comprising additives that increase electrical conductivity. This may advantageously reduce the risk of generating static charge which could cause sparks and start dangerous fires or initiate deadly explosions.

In other embodiments, the additives can reduce conductivity of the sheet 10. This may advantageously reduce the risk of electrical shock when contacting the sheet 10, for example from a nearby lightning strike.

In some embodiments, the additives may act as a fire retardant and/or reduce the flammability of the sheet 10. In some embodiments, the additives may enable the sheet 10 to be any one of luminous, fluorescent and phosphorescent.

In some embodiments, the webbing portion 20, 320 may be integrally formed with the margin portions 30, 31, 330, 331.

In some embodiments the sheet 10, 310 may be flexible such that it is less likely to fracture or crack when flexed or deformed. The sheet 10 may be elastically resilient such that it tends to retain its shape if flexed or deformed.

An apparatus 400 for fabricating the sheet 10, 210, 310 is shown in FIG. 4. The apparatus 400 comprises an extruder 410 for extruding and producing a continuous polymer sheet 412. The apparatus 400 further comprises an opening producing component 420 arranged to receive the continuous polymer sheet 412 and configured to produce primary openings 22, 322 and secondary openings 32, 33 in the polymer sheet 412. In an exemplary embodiment, the opening producing component 420 may comprise a hole-punching apparatus comprising a punch tool. The opening producing component 420 may be configured to repeatedly produce an array of primary openings 22 and secondary openings 32, 33. For example, the opening producing component 420 may repeatedly produce one or more lines of openings 22, 322, 32, 33 in the sheet 412 along the width W of the sheet 412 to progressively generate a longitudinally and laterally extending array of primary openings 22, 322 and an array of secondary openings 32, 33 in the sheet 412.

Figure 7:
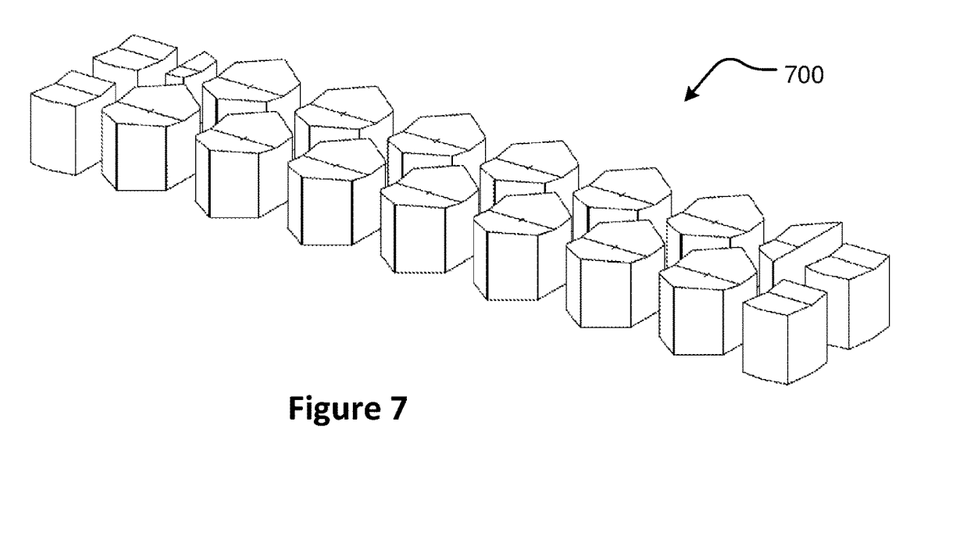
FIG. 7 is a perspective view of a punch tool according to some embodiments.
Figure 8:
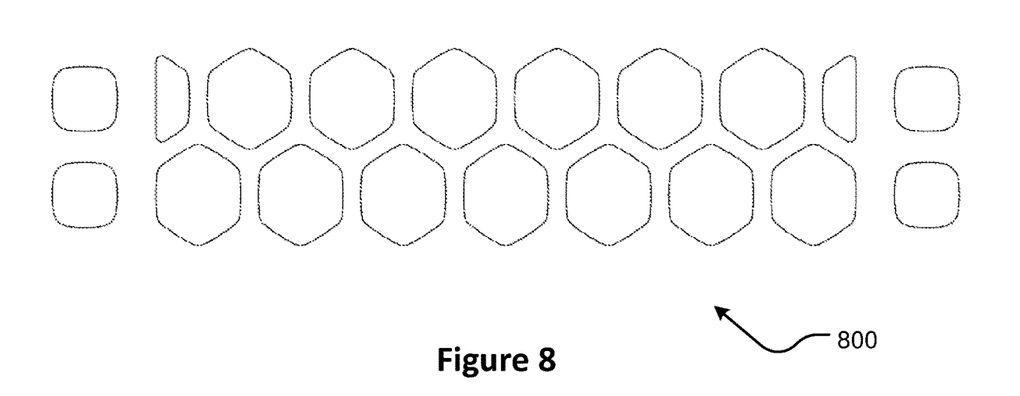
FIG. 8 is a top view of the array of openings produced by the punch tool of FIG. 7 in a polymer sheet.

FIG. 7 shows an exemplary punch tool 700 which, in some embodiments, may be a part of the opening producing component 420. The punch tool 700 may be mounted on an appropriate plate or substrate. When the sheet 412 is stationary, the punch tool 700 may be pressed against polymer sheet 412 and pressed at least partially through the polymer sheet 412 to concurrently produce lines of primary openings 22, 322 and secondary openings 32, 33 in the polymer sheet 412 in the corresponding array 800 shown in FIG. 8.

In some embodiments, the punch tool 700 may be formed from a tool steel. Tool steel generally has a greater hardness and/or wear resistance compared to other iron alloys or carbon-steels and is therefore better suited for repetitively puncturing of the polymer sheet 412 to produce openings 22, 322, 32, 33.

In some embodiments, the opening producing component 420 may be configured to produce secondary openings 32, 33 that are separated from each other by a distance D2 that is greater than the separation D1 between the primary openings 22, 322 produced.

In some embodiments, the opening producing component 420 may be configured to produce a plurality of webbing portions 20, 320 that define a plurality of primary openings 22 separated by a wider web portion 326 extending across the width of the sheet 310, 412.

Apparatus 400 also comprises a sheet forming component 430 for shaping the sheet 412 to produce sheet 10, 310. The sheet forming component 430 is arranged to receive the sheet 412 after primary and secondary openings 22, 322, 32, 33 have been produced in it. The sheet forming component 430 shapes the sheet 412 to produce sheet 10, 310 where first and second margin portions 30, 31, 330, 331 are angled out of a flat webbing plane defined by the webbing portion 20, 320 and the sheet 10, 310 defines elongate creases 14, 15 between the webbing portion 20, 320 and each of the first margin portion 30, 330 and second margin portion 31, 331.

In some embodiments, the sheet forming component 430 optionally comprises a creasing component 432 to form two creases in the sheet 412 to assist in shaping the sheet 412 and forming elongate creases 14, 15 along the crease.

In some embodiments, the sheet forming component 430 comprises a forming heater 434 to heat the sheet 412. This advantageously softens the sheet 412 to assist in shaping the sheet 412.

In some embodiments, the sheet forming component 430 comprises a set of forming rollers 436 to bend the sheet 412 along a line between the webbing portion 20, 320 and the margins 30, 330, 31, 331 to thereby form the elongate creases 14, 15. In embodiments that comprise a creasing component 432, the forming rollers 436 are aligned such that the bend is formed along the crease to form elongate creases 14, 15.

In some embodiments, the apparatus 400 further comprises a cutting component 440 such as a guillotine to cut the sheet 412 along the width W to form a separate sheet and limit the length L of the sheet 310.

In some embodiments, apparatus 400 comprises an injection moulding component for producing the polymer sheet 412. In some embodiments, apparatus 400 comprises a casting component for producing the polymer sheet 412.

Methods of producing a sheet are described with respect to apparatus 400 and/or punch tool 700 but the methods are not intended to be solely restricted to producing sheets with the specific apparatus 400 and/or punch tool 700 shown and reference is only made to components of apparatus 400 and/or punch tool 700 for illustrative and descriptive purposes.

Figure 5:
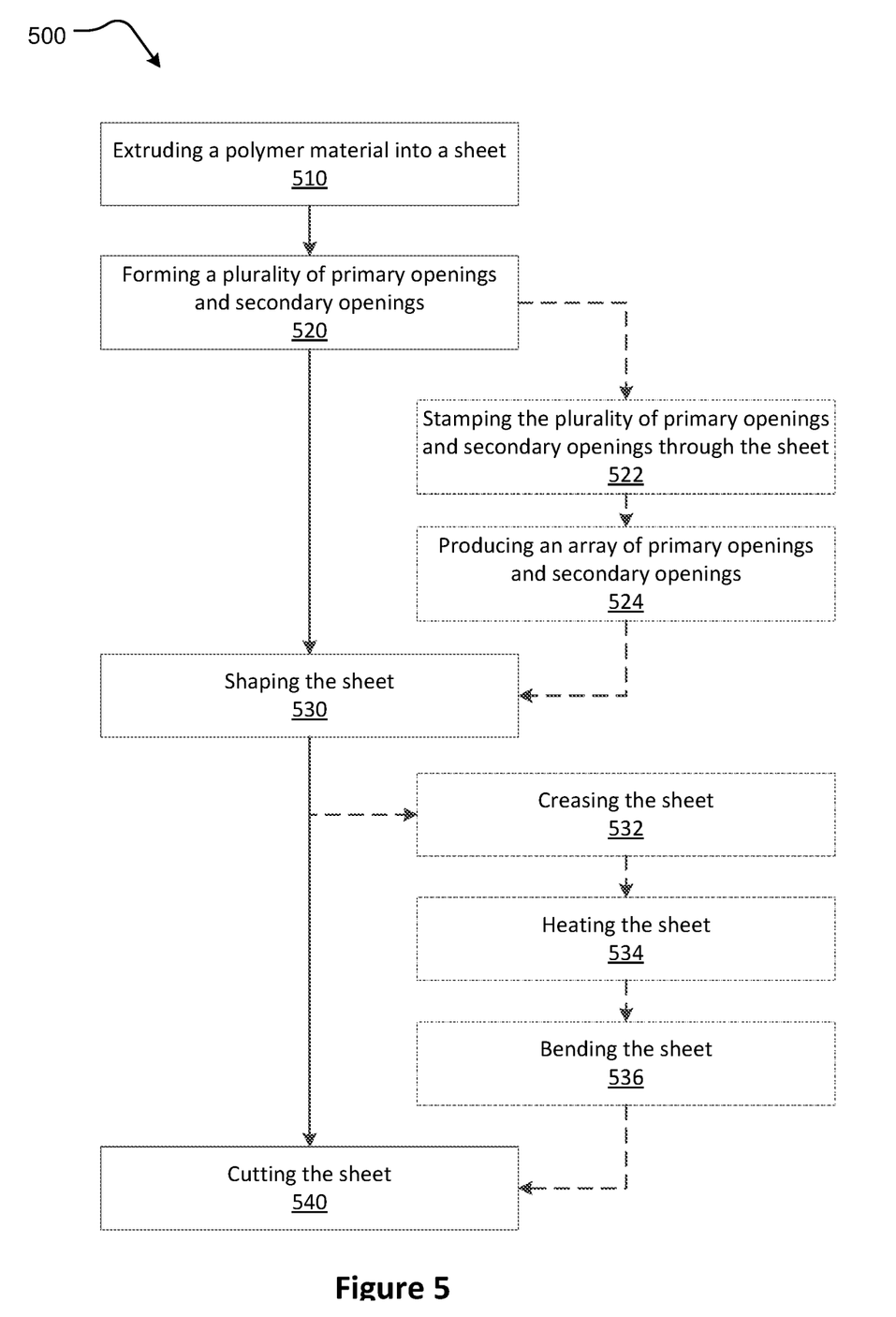
FIG. 5 is a flow chart for producing a polymer sheet according to some embodiments.

Referring to FIG. 5, a method 500 of producing a sheet 10, 310 is provided. The method 500 comprises extruding a polymer material, with an extruder 410, into a sheet 412 with a length L and a width W at 510. The method 500 further comprises forming, at 520, a plurality of primary openings 22 in a webbing portion 20, 320 and at least one secondary opening 32, 33 in each of a first margin portion 30, 330 and second margin portion 31, 331 using the opening producing component 420. The first and second margin portion 30, 330, 31, 331 extend along opposite edges of the sheet 10, 310 on either side of the webbing portion 20, 320 along the length L of the sheet 10, 310. The plurality of secondary openings 32, 332 are formed in each margin portion 30, 330, 31, 331 such that, when either margin portion 30, 31 and a margin portion 231 on the separate sheet 210 that is identical to sheet 10, 310 overlap (see FIG. 2), one or more secondary openings 233 on the separate sheet 210 are aligned with at least two of the plurality of secondary openings 32, 332 defined by the margin portion 30, 330 on sheet 10, 310 when the sheets 10, 210, 310 are aligned. The method 500 further comprises shaping with a sheet forming component 430, at 530, the sheet 10, 310 such that, the first or second margin portion 30, 31 are angled relative to the webbing portion 20.

In some embodiments, method 500 comprises injection moulding the polymer material, with an injection moulding component, into the sheet 412. In some embodiments, method 500 comprises casting the polymer material, with a casting component, into the sheet 412.

In some embodiments, the forming 520 comprises stamping the primary openings 22, 322 and secondary openings 32, 33 through the sheet 412, at 522. The stamping 522 may comprise using the punch tool 700 of the opening producing component 420 to produce the primary openings 22, 322 and secondary openings 32, 33. The forming 520 may also comprise producing a regular array of primary openings 22 and secondary openings 32, 33, at 524. The forming 520 may also comprise producing secondary openings 32, 33 with a separation D2 between the secondary openings 32, 33 that is greater than the separation D1 between the primary openings 22 produced.

In some embodiments, the forming 520 comprises stamping or punching the primary openings 22, 322 and secondary openings 32, 33 through the sheet 412 with the punch tool 700. The sheet 412 may be flat at least in the section being stamped or punched with openings 22, 322, 32, 33.

After a first set of at least one line of openings 22, 322, 32, 33 is produced by the punch tool 700, the polymer sheet 412 may be advanced for either a fixed time or distance so that another section of the polymer sheet 412 that does not have any openings may underlie the punch tool 700 and thereby enable the punch tool 700 to be actuated to produce one or more lines of openings. The punch tool 700 may be controlled to move in a periodic manner to produce an array of openings 22, 322, 32, 33. In some embodiments, the opening producing component 420 may, for example, be controlled to synchronise movement of the sheet 412 and the movement of the punch tool 700 to punch openings 22, 322, 32, 33.

In some embodiments, the forming 520 comprises producing a plurality of webbing portions 20, 320 comprising a plurality of primary openings 22 that are separated by a wider web portion 326 extending along the width W of the sheet 412.

In some embodiments, there may be a periodic delay in the movement of the punch tool 700 such that the wider web portion 326 results from the production of openings 22, 322, 32, 33. In some embodiments, the sheet 412 may be periodically advanced for a greater time or a greater distance such that the wider web portion 326 results from the production of openings 22, 322, 32, 33.

Optionally, the shaping 530 may comprise creasing the sheet 412 along the direction of its length L to assist bending of the sheet 412 to produce elongate creases 14, 15, at 532. The shaping 530 may also comprise heating the sheet 412 to soften the sheet 412, at 534 prior to producing creases 14, 15 (e.g. with forming rollers 436). In some embodiments, the sheet 412 is heated to around 150èC. The temperature required to soften the sheet 412, however, depends on the polymer material it is formed from. When the sheet 412 cools down to a certain temperature, which depends on the polymer material, the elongate creases 14, 15 may be retained and sheet 412 may advantageously retain the new shape that has been formed.

In some embodiments, the shaping 530 comprises bending the sheet 412 along a line between the webbing portion 20, 320 and the margins 30, 330, 31, 331 to thereby form the elongate creases 14, 15, at 536. For example, the sheet 412 may be bent with forming rollers 436.

In some embodiments, the shaping 530 results in a sheet 10, 310 where the margin portions 30, 31, 330, 331 are angled out of a flat webbing plane defined by the webbing portion 20, 320. The shaping 530 may result in a sheet 10, 310 where the first margin portion 30, 330 is angled out of the webbing plane in a first direction, and the second margin portion 31, 331 is angled out of the webbing plane in a second direction on the other side of the webbing plane.

In some embodiments, the sheet 412 is extruded by the extruder 410 at a rate of 0.5 to 2 m/min. In some embodiments, the sheet 412 is extruded by the extruder 410 at a rate of 1.0 to 1.2 m/min. The extrusion rate is a function of the sheet width W, thickness and the material. The extrusion rate is also dependent on the size of the extruder.

In some embodiments, the polymer material extruded in the extruding 510 comprises any one of polypropylene, polyethylene, low-density polyethylene, medium-density polyethylene, high-density polyethylene, polymers of olefins, Acrylonitrile butadiene styrene (ABS), polycarbonate and amorphous polymers.

In some embodiments, the method 500 further comprises cutting the sheet 412 using the cutting component 440 along the width W to form a separate sheet and limit the length L of the sheet 412, at 540.

Figure 6:
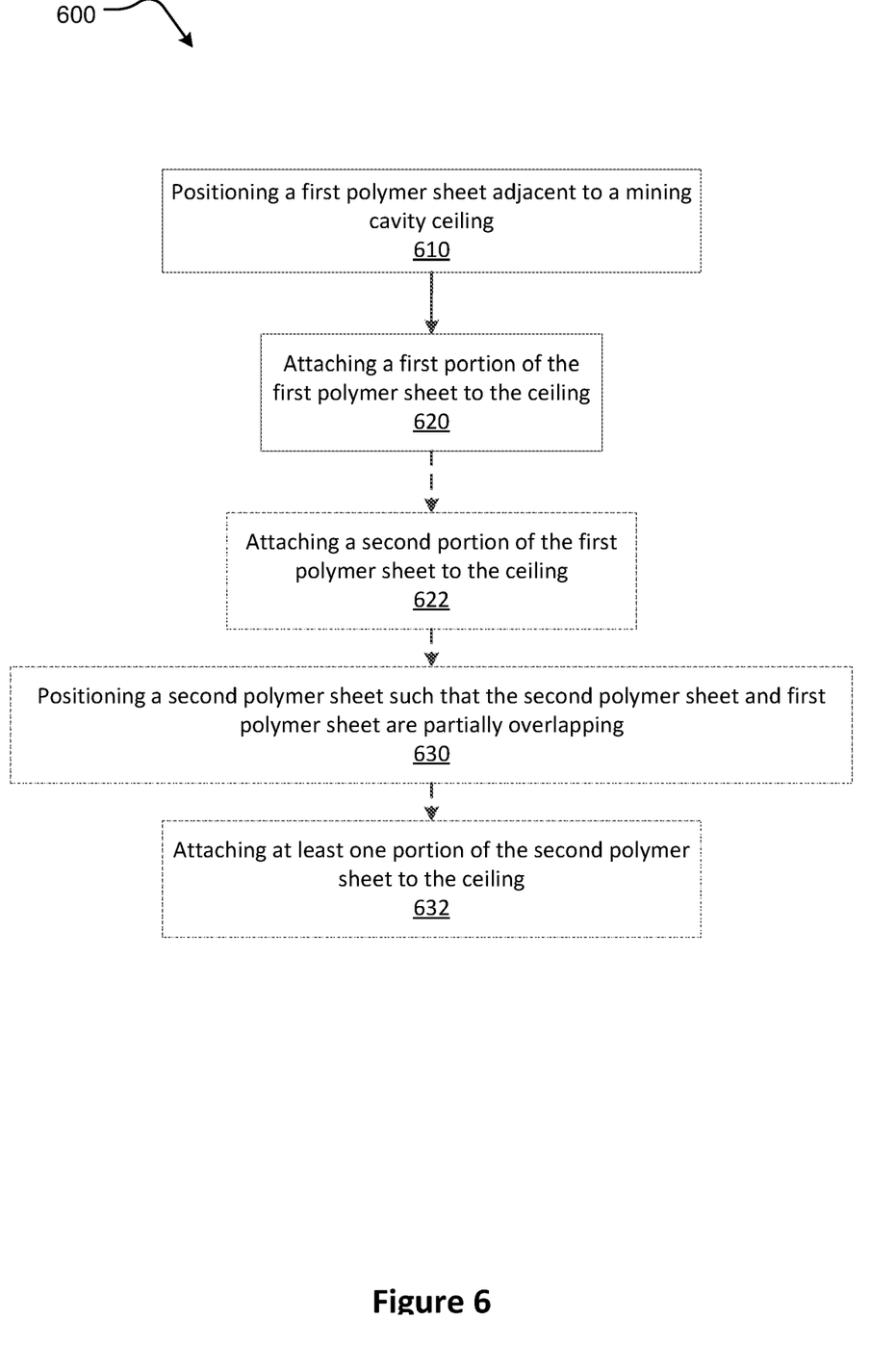
FIG. 6 is a flow chart for installing polymer sheets on a ceiling according to some embodiments.

Referring to FIG. 6, a method 600 of installing a protective covering on a ceiling of a geological cavity is disclosed. The method 600 comprises positioning a first polymer sheet 10, 310 near or on the ceiling, at 610. Then, at 620, attaching a first portion (not shown) of the first polymer sheet 10, 310 to the ceiling, wherein the attaching comprises using fasteners (not shown) to attach the first portion to the ceiling. A first section (not shown) of each fastener is attached to the ceiling while a second section (not shown) of each fastener passes through either a primary opening 22 or a secondary opening 32, 33 defined by the first polymer sheet 10, 310.

In some embodiments, the method 600 further comprises attaching a second portion (not shown) of the first polymer sheet 10, 310 to the ceiling, at 622. The first portion (not shown) is near a first end (not shown) of the first polymer sheet 10, 310 and the second portion is near a second end (not shown) opposite the first end along the length L of the first polymer sheet 10, 310. This may advantageously attach the entire sheet 10, 310 to the ceiling.

The method 600 may also comprise positioning a second polymer sheet 210 identical to the first polymer sheet 10, 310 such that: the second polymer sheet 210 partially overlaps the first polymer sheet 10, 310, at 630. At least one of the primary openings 22 or secondary openings 32, 33 in the second polymer sheet 210 is aligned with a primary opening 22 or a secondary opening 32, 33 in the first polymer sheet 10, 310.

As an example, a stack of polymer sheets 10, 310 may be stored on top of a vehicle (not shown) near the ceiling of the geological cavity. A polymer sheet 10, 310 may be slid along its length L off the top of the stack and positioned onto the ceiling. The vehicle may reposition adjacent to the position where the second polymer sheet 210 is to be positioned. The second polymer sheet 210 may then be slid along its length L off the top of the stack and positioned onto the ceiling.

At least one portion of the second polymer sheet 210 may be attached to the ceiling, at 632. Attaching 632 the at least one portion of the second polymer sheet 210 may also comprise using the same fasteners used to attach the first or second portion of the first polymer sheet 10, 310 to the ceiling, and the second section of the fasteners passes through aligned openings in the first polymer sheet 10, 310 and second polymer sheet 210. This advantageously attaches the first polymer sheet 10, 310 and the second polymer sheet 210 to the ceiling.

In some embodiments, the positioning 630 of the second polymer sheet 210 may comprise overlapping a first margin portion 30 of the first polymer sheet 10, 310 and a second margin portion 231 of the second polymer sheet 210. The first margin portion 30 may be on top of the second margin portion 231 and closer to the ceiling. Alternatively, the second margin portion 231 may be on top of the first margin portion 30. Using the same fastener to attach both sheets 10, 210, 310 along adjacent and overlapping margin portions 30, 31, 231 of the two sheets 10, 210, 310 reduces the total number of fasteners required, when compared to each sheet 10, 210, 310 using separate fasteners.

In some embodiments, at least two portions of the second polymer sheet 210 may be attached to the ceiling and at least one portion is near a first end of the second polymer sheet 210 and at least one portion is near a second end opposite the first end along the length L of the second polymer sheet 210. This may advantageously attach the entire sheet 10, 310 to the ceiling.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A polymer sheet adapted to attach to a ceiling of a geological cavity and provide protective cover, the sheet comprising:
    a webbing portion defining a plurality of primary openings; and
    two margin portions extending along opposite edges of the sheet on either side of the webbing portion along a length of the sheet, each margin portion defining a plurality of secondary openings, wherein the margin portions are angled relative to the webbing portion,
    wherein the sheet is shaped such that the margin portions are angled out of a webbing plane defined by the webbing portion and the sheet defines elongate creases between the webbing portion and each margin portion,
    wherein the elongate creases form an obtuse angle between the webbing portion and either of the margin portions in a range of 140° to 160°.

2. The sheet of claim 1, wherein the margin portions are angled out of the webbing plane in opposite directions on either side of the webbing plane.

3. A polymer sheet adapted to attach to a ceiling of a geological cavity and provide protective cover, the sheet comprising:
    a webbing portion defining a plurality of primary openings; and
    two margin portions extending along opposite edges of the sheet on either side of the webbing portion along a length of the sheet, each margin portion defining a plurality of secondary openings, wherein the margin portions are angled relative to the webbing portion,
    wherein the sheet comprises a plurality of webbing portions and adjacent webbing portions are separated by a wider web portion extending between the margin portions, wherein the dimension of the wider web portion is greater than the largest dimension of the openings.

4. The sheet of claim 3, wherein the sheet is shaped such that the margin portions are angled out of a webbing plane defined by the webbing portion and the sheet defines elongate creases between the webbing portion and each margin portion.

5. The sheet according to claim 3, wherein the secondary openings defined by the two margin portions are arranged in a regular array.

6. The sheet according to claim 5, wherein the regular array of secondary openings in each margin portion is the same so that, when either one of the margin portions and a margin portion on an identical but separate sheet are overlapping, at least two of the secondary openings are aligned.

7. The sheet according to claim 3, wherein a separation between the secondary openings is greater than a separation between primary openings.

8. The sheet according to claim 3, wherein the sheet is a self-supporting structure and is flexible.

9. A method of installing protective covering on a ceiling of a geological cavity comprising:
  positioning a first polymer sheet according to claim 3 near or on the ceiling; and
  attaching a first portion of the first polymer sheet to the ceiling, wherein the attaching comprises using fasteners to attach the first portion to the ceiling, and a first section of each fastener is attached to the ceiling while a second section of each fastener passes through either a primary or secondary opening defined by the first polymer sheet.

10. The method of claim 9, further comprising attaching a second portion of the first polymer sheet to the ceiling, the first portion is near a first end of the first polymer sheet and the second portion is near a second end opposite the first end along the length of the first polymer sheet.

11. The method according to claim 9, further comprising:
  positioning a second polymer sheet according to claim 1 such that: the second polymer sheet partially overlaps the first polymer sheet, and at least one of the primary or secondary openings in the second polymer sheet is aligned with a primary or secondary opening in the first polymer sheet; and
  attaching at least one portion of the second polymer sheet to the ceiling.

12. The method according to claim 11, wherein attaching the at least one portion of the second polymer sheet comprises using the same fasteners used to attach the first or second portion of the first polymer sheet to the ceiling, and the second section of the fasteners pass through aligned openings in the first and second polymer sheet.

13. A method of producing a polymer sheet adapted to attach to a ceiling of a geological cavity and provide protective cover, the method comprising:
  extruding a polymer material into a sheet with a length and a width, wherein the sheet comprises a plurality of webbing portions;
  forming a plurality of primary openings in at least one of the webbing portions and forming a plurality of secondary openings in each of a first and second margin portion,
    wherein the first and second margin portion extend along opposite edges of the sheet on either side of the webbing portions along the length of the sheet,
    wherein adjacent webbing portions are separated by a wider web portion extending between the margin portions, and
    wherein the dimension of the wide web portion is greater than the largest dimension of the openings; and
  shaping the sheet such that the first and second margin portion are angled relative to the webbing portions.

14. The method according to claim 13, wherein the sheet is shaped such that the margin portions are angled out of a webbing plane defined by the webbing portions and the sheet defines elongate creases between the webbing portions and each of the first and second margin portions.

15. The method of claim 14, wherein the sheet is shaped such that the first margin portion is angled out of the webbing plane in a first direction and the second margin portion is angled out of the webbing plane in a second direction on the other side of the webbing plane.

16. The method according to claim 13, wherein the plurality of secondary openings are formed in a regular array, and the regular array of secondary openings in the first margin portion is formed to be the same as the regular array of secondary openings in the second margin portion so that, when either of the first or second margin portion and a margin portion on an identical but separate sheet are overlapping, at least two of the secondary openings are aligned.

17. The method according to claim 13, wherein a separation between the secondary openings is greater than a separation between primary openings.

18. A polymer sheet adapted to attach to a ceiling of a geological cavity and provide protective cover, the sheet comprising:
  a plurality of webbing portions located adjacent to each other, each webbing portion defining a plurality of primary openings, wherein a first separation divides adjacent primary openings; and
  two margin portions extending along opposite edges of the sheet on either side of the webbing portions along a length of the sheet, each margin portion defining a plurality of secondary openings, wherein adjacent webbing portions are separated by a wider web portion extending between the margin portions, and wherein the dimension of the wider web portion is greater than the largest dimension of the first separation between the primary openings.

19. The sheet according to claim 18, wherein a second separation between the secondary openings is greater than the first separation.

20. A method of producing a polymer sheet adapted to attach to a ceiling of a geological cavity and provide protective cover, the method comprising:
  extruding a polymer material into a sheet with a length and a width, wherein each sheet comprises a plurality of webbing portions located adjacent to each other;
  forming a plurality of primary openings in a webbing portion and a plurality of secondary openings in each of a first and second margin portion, wherein the first and second margin portion extend along opposite edges of the sheet on either side of the webbing portion along the length of the sheet;
  wherein a first separation divides adjacent primary openings, wherein adjacent webbing portions are separated by a wider web portion extending between the margin portions, and wherein the dimension of the wider web portion is greater than the largest dimension of the first separation between the primary openings.

* * * * *